United States Patent
Nishida

(10) Patent No.: US 7,560,911 B2
(45) Date of Patent: Jul. 14, 2009

(54) STEP-UP/STEP-DOWN SWITCHING REGULATOR

(75) Inventor: Junji Nishida, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 59 days.

(21) Appl. No.: 11/935,799

(22) Filed: Nov. 6, 2007

(65) Prior Publication Data
US 2008/0116868 A1  May 22, 2008

(30) Foreign Application Priority Data
Nov. 21, 2006  (JP) ............................ 2006-314288

(51) Int. Cl.
*G05F 1/24* (2006.01)
(52) U.S. Cl. .................. 323/259; 323/271; 323/284
(58) Field of Classification Search ............. 323/259, 323/271, 282, 284, 285, 290, 351
See application file for complete search history.

(56) References Cited

U.S. PATENT DOCUMENTS

| | | | |
|---|---|---|---|
| 4,395,675 A * | 7/1983 | Toumani | 323/271 |
| 2004/0067740 A1* | 4/2004 | Handa et al. | 455/127.1 |
| 2007/0120546 A1* | 5/2007 | Hagino | 323/282 |

FOREIGN PATENT DOCUMENTS

| | | |
|---|---|---|
| JP | 11-299229 | 10/1999 |
| JP | 2006-259779 | 9/2006 |

* cited by examiner

*Primary Examiner*—Jessica Han
(74) *Attorney, Agent, or Firm*—Cooper & Dunham, LLP

(57) ABSTRACT

A disclosed step-up/step-down switching regulator includes a step-up/step-down part using an inductor for stepping up or stepping down an input voltage from an input terminal and outputting the stepped-up/stepped-down voltage from an output terminal according to a control signal, and a control part for controlling the stepping-up/stepping-down by the step-up/step-down part according to a voltage difference between a voltage proportional to the voltage output from the step-up/step-down part and a predetermined reference voltage. The control part includes an error amplifier circuit part for amplifying the voltage difference between the proportional voltage and the reference voltage and outputting the amplified voltage, an inverting amplifier circuit part for performing inverting amplification on the voltage output from the error amplifier circuit and outputting the inverted voltage, and an output control part for performing a step-down operation on the step-up/step-down part according to the voltage output from the error amplifier circuit part and performing a step-up operation on the step-up/step-down part according to the voltage output from the inverting amplifier circuit part.

5 Claims, 5 Drawing Sheets

US 7,560,911 B2

STEP-UP/STEP-DOWN SWITCHING REGULATOR

BACKGROUND OF THE INVENTION

1. Field of the Invention

The present invention relates to a step-up/step-down switching regulator supplying power to a load by converting input direct voltage from, for example, a battery, to a predetermined constant voltage for use in various electronic devices.

2. Description of the Related Art

FIG. 3 is a circuit diagram showing an example of a conventional step-up/step-down switching regulator (see, for example, Japanese Laid-Open Patent Application No. 11-299229). FIG. 4 is a timing chart illustrating examples of waveforms of respective parts in the circuit of FIG. 3.

In FIG. 3, the voltage difference between a predetermined reference voltage Vref and a divided voltage Vfb obtained by dividing an output voltage Vo with resistors R111, R112 is amplified by an error amplifier circuit including an operational amplifier circuit 111 and resistors R113, R114. The voltage Vb output from the operational amplifier circuit 111 is input to a step-up PWM comparator 117 and compared with a triangular wave voltage Vt, to thereby generate a pulse-width modulated signal. Then, a step-up drive circuit 118 controls the on/off switching of a step-up switching transistor Tr 112 according to the pulse-width modulated signal.

Further, a level shift circuit including an operational amplifier circuit 113, resistors R115-R118, and a shift voltage generating circuit 114 subtracts a shift voltage Vs from the voltage Vb output from the operational amplifier circuit 111, to thereby obtain a subtracted voltage Va. Then, the subtracted voltage Va is input to a step-down PWM comparator 115 and compared with the triangular wave voltage Vt, to thereby generate a pulse-width modulated signal. Then, a step-down drive circuit 116 controls the on/off switching of a step-down switching transistor Tr 111 according to the pulse-width modulated signal.

With reference to FIG. 4, in a case where the voltage amplitude of the triangular wave voltage Vt is "V1", the voltage Vb and the voltage Va will not intersect the triangular wave voltage Vt at the same time when the shift voltage is equal to or greater than V1. The voltage Va becomes equal to or less than a lower limit voltage of the triangular wave voltage Vt when the voltage Vb is within the amplitude range of the triangular wave voltage Vt. The voltage Vb becomes equal to or greater than an upper limit voltage of the triangular wave voltage Vt when the voltage Va is within the amplitude range of the triangular wave voltage Vt.

Accordingly, in a case of a step-up operation, the step-down switching transistor Tri11 is switched on to attain a conduction state. In a case of switching from the step-up operation to a step-down operation, the on-duty cycle of the step-down switching transistor Tr111 is gradually reduced after the on-duty cycle of the step-up switching transistor Tr112 becomes 0%.

Likewise, during the step-down operation, the step-up switching transistor Tr112 is switched off to attain a shut-off state. In a case of returning from the step-down operation to a step-up operation, the step-up switching transistor Tr112 is switched on after the on-duty cycle of the step-down switching transistor Tr111 becomes 100%.

In FIG. 3, since the level shift circuit subtracts a shift voltage from the voltage Vb output from the operational amplifier circuit 111 of the error amplifier circuit, the upper limit voltage of the range of voltage output from the operational amplifier circuit 111 is required to be at least equal to or greater than a voltage obtained by adding the amplitude voltage V1 of the triangular wave voltage Vt to the upper limit voltage of the triangular wave voltage Vt.

FIG. 5 is a circuit diagram showing another example of a conventional step-up/step-down switching regulator (see, for example, Japanese Laid-Open Patent Application No. 11-299229).

In FIG. 5, the level shift circuit of FIG. 3 is configured to add a shift voltage Vs to a voltage Va output from the operational amplifier circuit 111 used in the error amplifier circuit. Therefore, in the example shown in FIG. 5, the output voltage Va of the operational amplifier circuit 111 is directly input to the step-down PWM comparator 115, and the output voltage Vb of the operational amplifier circuit 113 used in the level shift circuit is input to the step-up PWM comparator 117.

Although operation of the circuit shown in FIG. 5 is similar to that of the circuit shown in FIG. 3, since the level shift circuit performs the above-described addition process, the lower limit of the voltage output from the operational amplifier circuit 111 is required to be at least the amplitude voltage V1 of the triangular wave voltage Vt lower than the lower limit voltage of the triangular wave voltage Vt.

In FIG. 3, the step-up operation is performed by inputting the output voltage Vb of the error amplifier circuit to the step-up PWM comparator 117. Generally, in a case of performing the step-up operation, the frequency characteristics, which are determined according to an inductor and a smoothing capacity, become unstable (e.g., greater oscillation compared to the oscillation during the step-down operation) since the phase of the step-up operation, unlike that of the step-down operation, is delayed 180 degrees. Therefore, phase compensation for stabilizing the step-up operation is performed, for example, by connecting a condenser to a feedback loop. However, this causes the capacity of phase compensation to become greater than that of the step-down operational amplifier circuit. Therefore, the frequency characteristics of the operational amplifier circuit 111 are restrained (particularly, high frequency characteristics degrade significantly). In a case where the output voltage Vb of the operational amplifier circuit 111 having the degraded high frequency characteristics is input to the level shift circuit, the high frequency characteristics of the output voltage Va of the level shift circuit degrade further. Thus, the high frequency characteristics during the step-down operation remain degraded. This adversely affects the response time for both the step-up operation and the step-down operation.

In the circuit illustrated in FIG. 5, since output voltage Va of the error amplifier circuit is input to the step-down PWM comparator 115, the amount of phase compensation of the operational amplifier circuit 111 used in the error amplifier circuit can be reduced, and the degrading of high frequency characteristics can be reduced. However, since voltage Vs is added to the output voltage Va of the operational amplifier circuit 111 for performing the step-up operation, operations are always started from the step-up operation when power is turned on. Since the step-down switching transistor Tr111 is switched on during the step-up operation, an output condenser C112 is charged with a large amount of current from an input voltage via the step-down switching transistor Tr111, an inductor L111, and a rectifier diode D112 when power is turned on. Thus, a large inrush current is generated when power is turned on. Therefore, the circuit of FIG. 5 needs to control incoming current by providing, for example, a soft start circuit for restraining inrush current.

SUMMARY OF THE INVENTION

The present invention may provide a step-up/step-down switching regulator that substantially obviates one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by a step-up/step-down switching regulator particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a step-up/step-down switching regulator including a step-up/step-down part using an inductor for stepping up or stepping down an input voltage from an input terminal and outputting the stepped-up/stepped-down voltage from an output terminal according to a control signal; and a control part for controlling the stepping-up/stepping-down by the step-up/step-down part according to a voltage difference between a proportional voltage proportional to the voltage output from the step-up/step-down part and a predetermined reference voltage; wherein the control part includes an error amplifier circuit part for amplifying the voltage difference between the proportional voltage and the reference voltage and outputting the amplified voltage, an inverting amplifier circuit part for performing inverting amplification on the voltage output from the error amplifier circuit and outputting the inverted voltage, and an output control part for performing a step-down operation on the step-up/step-down part according to the voltage output from the error amplifier circuit part and performing a step-up operation on the step-up/step-down part according to the voltage output from the inverting amplifier circuit part.

Other objects and further features of the present invention will be apparent from the following detailed description when read in conjunction with the accompanying drawings.

DESCRIPTION OF THE PREFERRED EMBODIMENTS

In the following, embodiments of the present invention are described with reference to the accompanying drawings.

Figure 1:
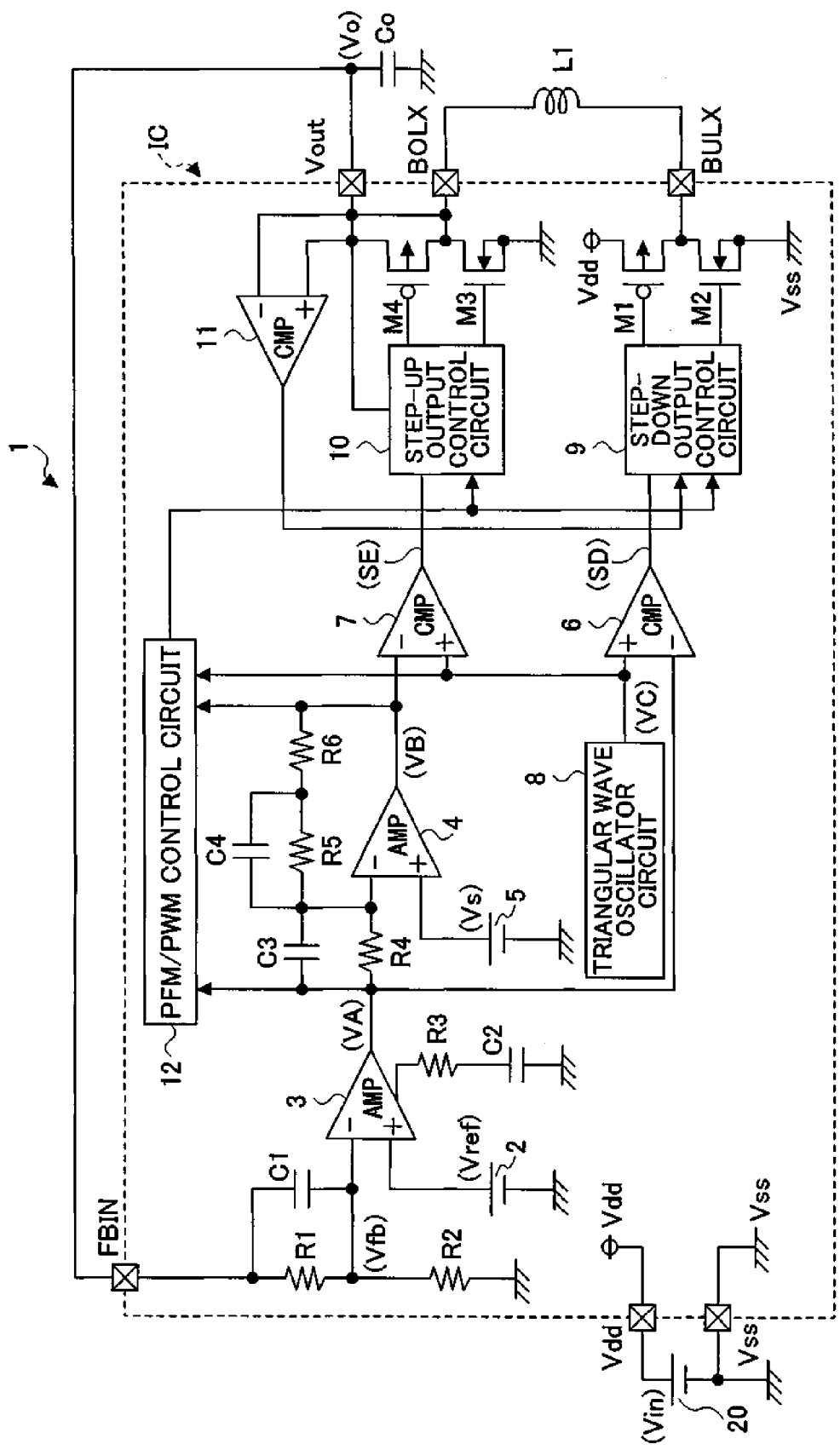
FIG. 1 is a circuit diagram showing an example of a step-up/step-down switching regulator according to an embodiment of the present invention.

FIG. 1 is a circuit diagram showing an example of a step-up/step-down switching regulator 1 according to a first embodiment of the present invention. In FIG. 1 the step-up/step-down switching regulator 1 converts an input voltage Vin, input from a direct current power source 20 to an input terminal Vdd, into a predetermined constant voltage by stepping up or stepping down the input voltage Vin and outputs the converted voltage Vo from an output terminal Vout.

The step-up/step-down switching regulator 1 according to an embodiment of the present invention includes resistors R1, R2 for generating a proportional voltage Vfb proportional to the output voltage Vout; a condenser C1; a reference voltage generating circuit 2 for generating a predetermined reference voltage Vref and outputting the generated reference voltage Vref; an error amplifier circuit including an operational amplifier circuit 3, a resistor R3, and a condenser C2; and an inverting amplifier circuit including an operational amplifier circuit 4, resistors R4-R6, condensers C3-C4, and a shift voltage generating circuit 5 for generating a predetermined shift voltage and outputting the generated shift voltage.

Furthermore, the step-up/step-down switching regulator 1 also includes a step-down PWM comparator 6; a step-up PWM comparator 7; a triangular wave oscillator circuit 8 for generating a predetermined triangular wave voltage VC and outputting the generated triangular wave voltage VC; a step-down output control circuit 9; a step-up output control circuit 10; a step-down switching transistor M1 using a PMOS transistor; a step-down synchronous rectifier transistor M2 using an NMOS transistor; a step-up switching transistor M3 using an NMOS transistor; a step-up switching transistor M4 using a PMOS transistor; an inductor L1; an output condenser Co; a comparator 11; and a PFM/PWM control circuit 12. Each of the circuits of the step-up/step-down switching regulator 1 except for the inductor L1 and the output condenser Co are integrated onto a single IC, in which the IC includes an input terminal Vdd serving as a power source terminal, a ground terminal Vss, an output terminal Vout, and terminals FBIN, BOLX, and BULX (see FIG. 1).

It is to be noted that the step-down switching transistor M1, the step-down synchronous rectifier transistor M2, the step-up switching transistor M3, the step-up synchronous rectifier M4, the inductor L1, and the output condenser Co constitute a step-up/step-down part of the step-up/step-down switching regulator 1 according to an embodiment of the present invention. Further, the resistors R1-R6, the condensers C1-C4, the reference voltage generating circuit 2, the operational amplifier circuits 3 and 4, the shift voltage generating circuit 5, the step-down PWM comparator 6, the step-up PWM comparator 7, the triangular wave oscillator circuit 8, the step-down output control circuit 9, the step-up output control circuit 10, and the PFM/PWM control circuit 12 constitute a control part of the step-up/step-down switching regulator 1 according to an embodiment of the present invention. Further, the operational amplifier circuit 3, the resistor R3, and the condenser C2 constitute an error amplifier circuit part of the step-up/step-down switching regulator 1 according to an embodiment of the present invention. Further, the operational amplifier circuit 4, the resistors R4-R6, the condensers C3-C4, and the shift voltage generating circuit 5 constitute an inverting amplifier circuit part of the step-up/step-down switching regulator 1 according to an embodiment of the present invention. Further, the step-down PWM comparator 6, the step-up PWM comparator 7, the triangular wave oscillator circuit 8, the step-down output control circuit 9, the step-up output control circuit 10, and the PFM/PWM control circuit 12 constitute an output control circuit part of the step-up/step-down switching regulator 1 according to an embodiment of the present invention.

In the operational amplifier circuit 3 included in the error amplifier circuit, a proportional voltage Vfb, which is generated by dividing the output voltage Vo, is input to an inverting input terminal of the operational amplifier circuit 3 and a reference voltage Vref is input to a non-inverting input terminal of the operational amplifier circuit 3. The output terminal of the operational amplifier circuit 3 is connected to an inverting input terminal of the operational amplifier circuit 4 included in the inverting amplifier circuit via the resistor R4 and to an inverting input terminal of the step-down PWM comparator 6. It is to be noted that the resistor R3 and the condenser C2 perform phase compensation of the operational amplifier circuit 3.

In the operational amplifier circuit 4, a shift voltage Vs is input to a non-inverting input terminal of the operational amplifier circuit 4 from the shift voltage generating circuit 5, and a serial circuit comprising the resistor R5 and the resistor R6 is connected between the output terminal and the inverting input terminal of the operational amplifier circuit 4. Further, phase compensation of the operational amplifier circuit 4 is performed by having the condenser C3 connected in parallel with the resistor R4 and the condenser C4 connected in parallel with the resistor R5. Further, the output terminal of the operational amplifier circuit 4 is connected to an inverting input terminal of the step-up PWM comparator 7.

The triangular wave voltage VC output from the triangular wave oscillator circuit 8 is input to a non-inverting input terminal of the step-down PWM comparator 6 and a non-inverting input terminal of the step-up PWM comparator 7, respectively. An output signal SE of the step-up PWM comparator 7 is input to the step-up output control circuit 10. In accordance with the output signal SE from the step-up PWM comparator 7, the step-up output control circuit 10 performs on/off control on the step-up switching transistor M3 and the step-up synchronous rectifier transistor M4. An output signal SD of the step-down PWM comparator 6 is input to the step-down output control circuit 9. In accordance with the output signal SD from the step-down PWM comparator 6, the step-down output control circuit 9 performs on/off control on the step-down switching transistor M1 and the step-down synchronous rectifier transistor M2.

In the step-down switching transistor M1, the source is connected to an input terminal Vdd, and the drain is connected to the drain of the step-down synchronous rectifier transistor M2 and the terminal BULX. The source of the step-down synchronous transistor M2 is connected to a ground terminal Vss. In the step-up switching transistor M3, the source is connected to the ground terminal Vss, and the drain is connected to one end (first end) of the step-up synchronous rectifier transistor M4 and the terminal BOLX. The other end (second end) of the step-up synchronous rectifier transistor M4 is connected to an output terminal Vout. The comparator 11 is connected to the step-up synchronous rectifier transistor M4 by having its input terminals connected in correspondence with the first and second ends of the step-up synchronous rectifier transistor M4. The comparator 11 is for detecting reverse flow of the current output from the output terminal Vout. The output terminal of the comparator 11 is connected to the step-down output control circuit 9.

One end of the inductor L1 is connected to a joint between the step-up switching transistor M3 and the step-up synchronous rectifier transistor M4 via the terminal BOLX while the other end of the inductor L1 is connected to a joint between the step-down switching transistor M1 and the step-down synchronous rectifier transistor M2 via the terminal BULX. The output condenser Co is connected between the output terminal Vout and the ground terminal Vss. The output signal from the operational amplifier circuit 3, the output signal from the operational amplifier circuit 4, and the triangular wave voltage VC from the triangular wave oscillator circuit 8 are input to the PFM/PWM control circuit 12, respectively. The output signal from the PFM/PWM control circuit 12 is input to the step-down output control circuit 9 and the step-up output control circuit 10, respectively.

Figure 2:
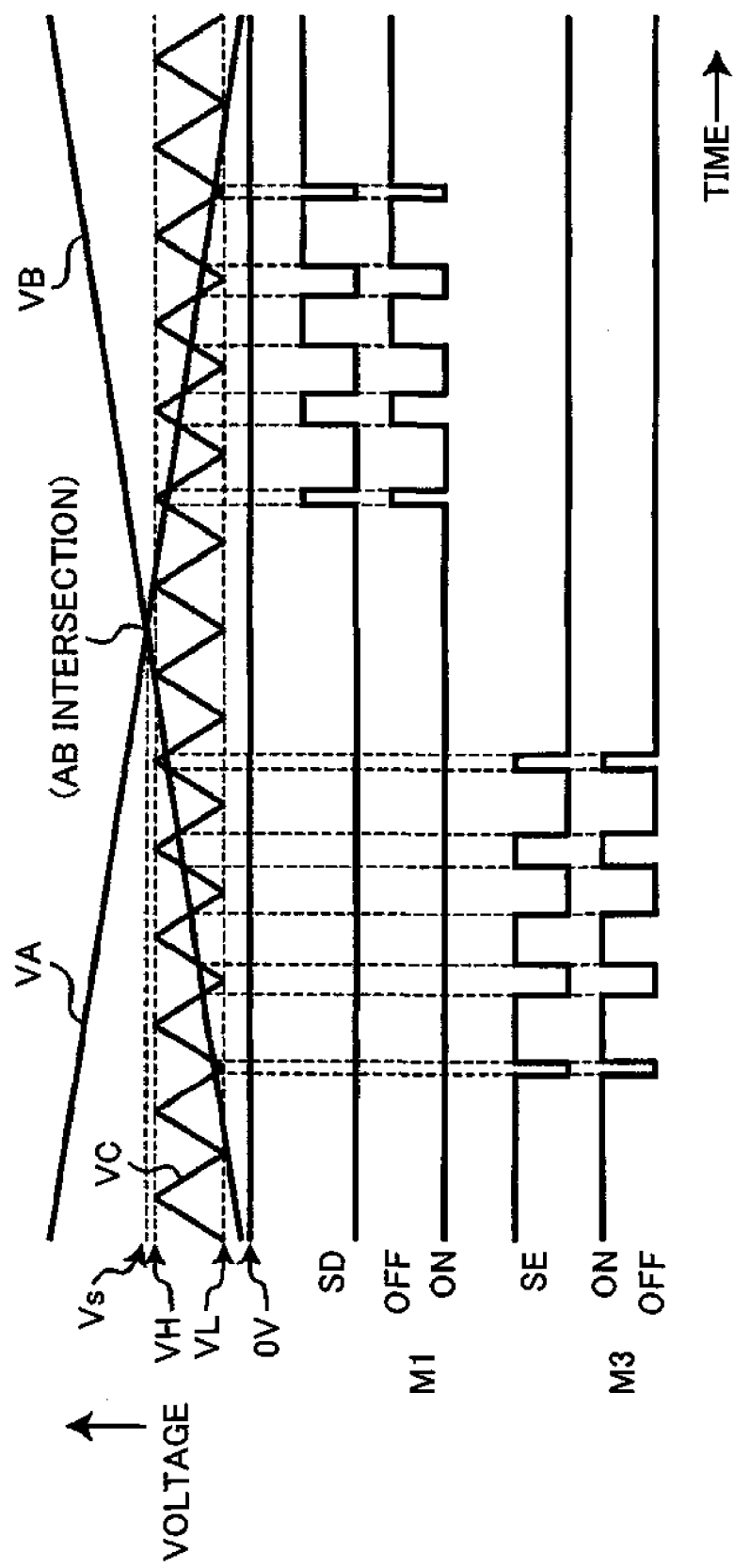
FIG. 2 is a timing chart for describing operations of the step-up/step-down switching regulator shown in FIG. 1.
Figure 3:
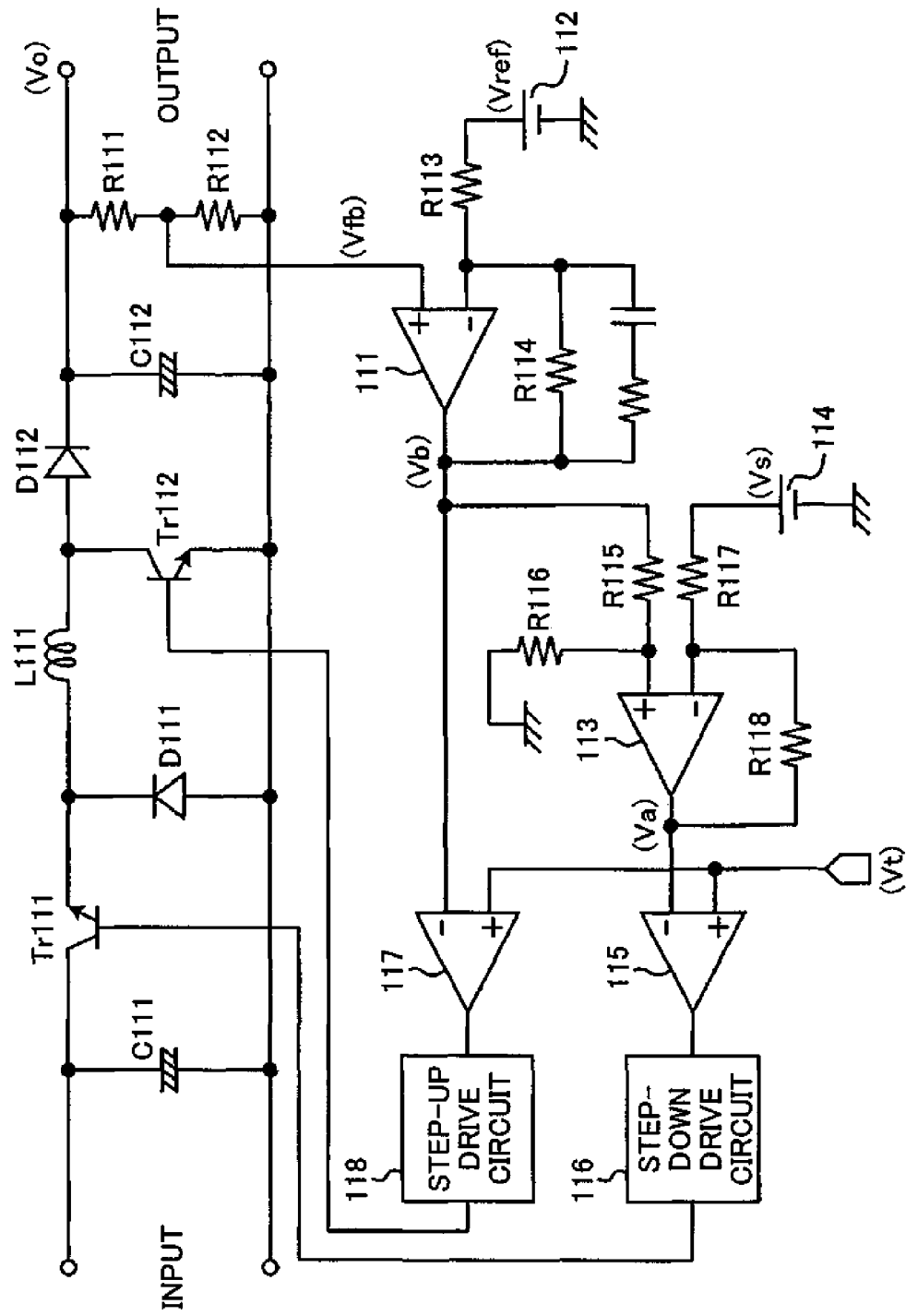
FIG. 3 is a circuit diagram showing an example of a conventional step-up/step-down switching regulator.
Figure 4:
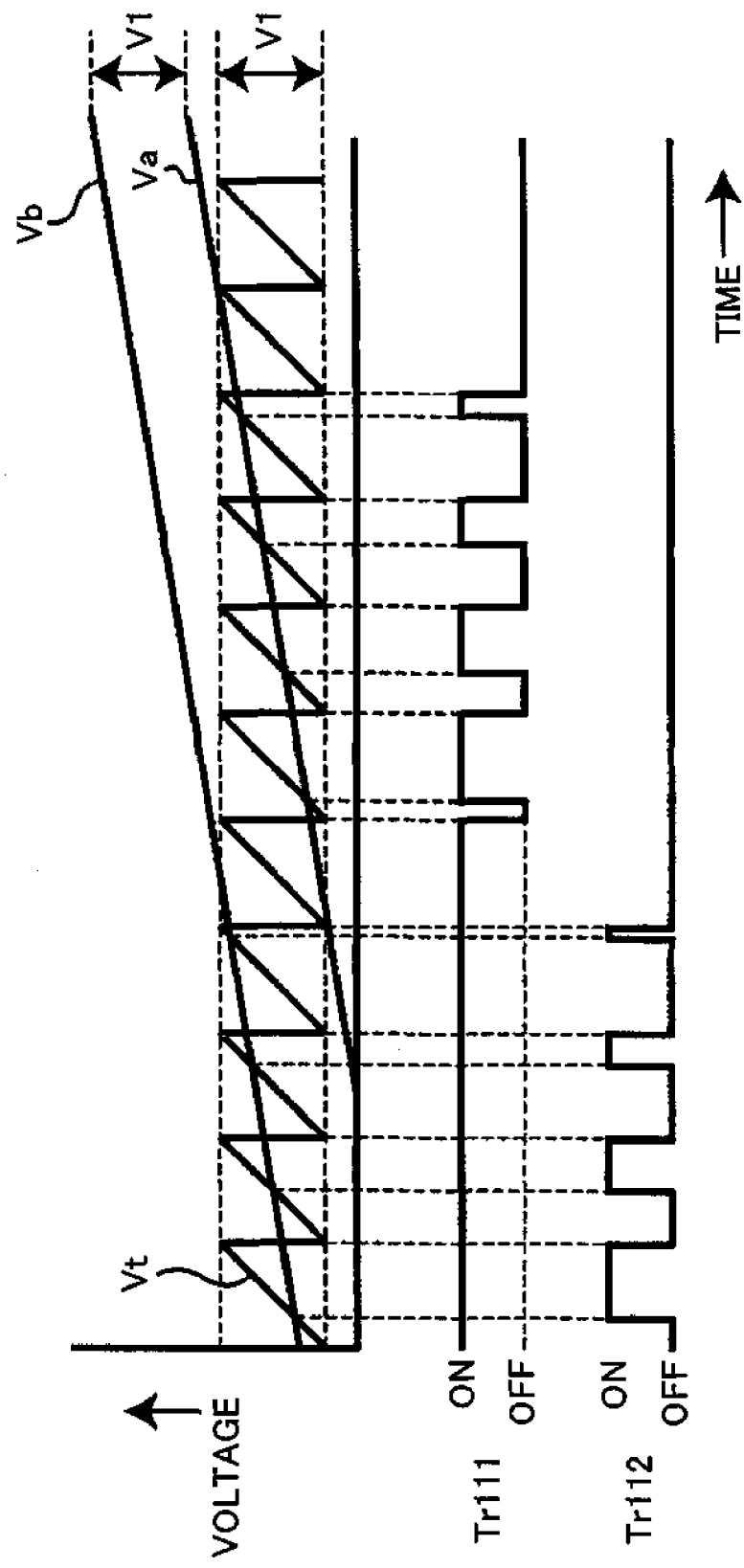
FIG. 4 is a timing chart showing examples of waveforms of each part of the conventional step-up/step-down switching regulator shown in FIG. 3.
Figure 5:
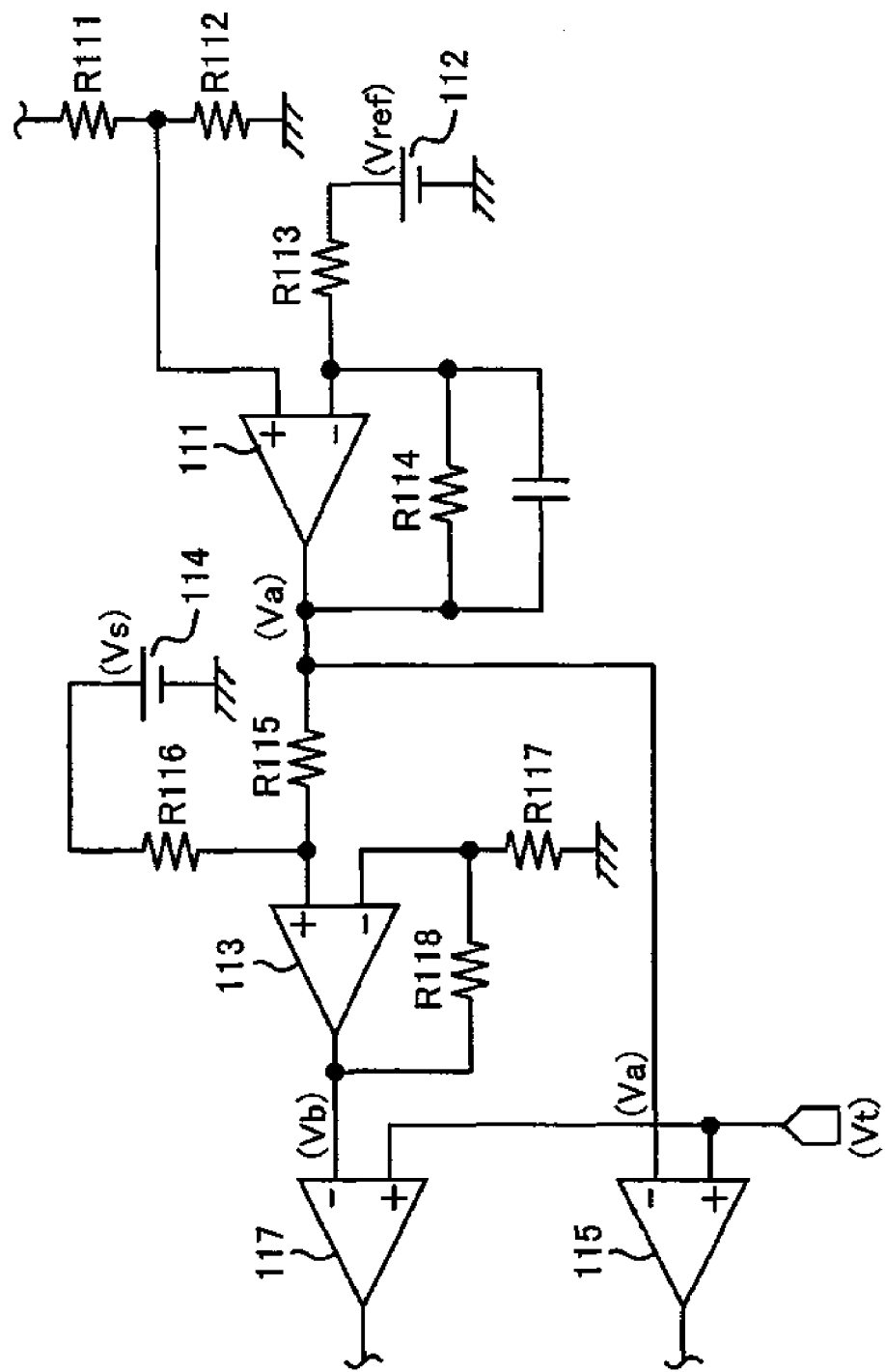
FIG. 5 is a circuit diagram showing another example of a conventional step-up/step-down switching regulator.

An exemplary operation of the step-up/step-down switching regulator 1 shown in FIG. 1 is described with reference to FIG. 2. FIG. 2 is a timing chart showing the exemplary operation of the step-up/step-down switching regulator 1 according to an embodiment of the present invention.

The operational amplifier circuit 3 amplifies the voltage difference between the proportional voltage Vfb and the reference voltage Vref and outputs the amplified voltage difference. The output voltage VA of the operational amplifier circuit 3 is input to the step-down PWM comparator 6 which performs step-down control. This enables the capacity of the condenser C2 performing phase compensation to be small. Thereby, phase compensation can be performed without having to sacrifice much of the high frequency characteristics, and high response speed can be achieved. Further, the output voltage VA of the operational amplifier circuit 3 is inverted in the inverting amplifier circuit to become output voltage VB. The output voltage VB is input to the step-up PWM comparator 7. Since the operational amplifier circuit 4 included in the inverting amplifier circuit is used for step-up control, the capacity of the condenser performing phase compensation becomes large. Therefore, the high frequency characteristics of the operational amplifier circuit 4 are poorer compared to those of the operational amplifier circuit 3.

The output voltage VA of the operational amplifier circuit 3 and the output voltage VB of the operational amplifier circuit 4 are PWM modulated to a pulse width based on its voltage value by the step-down PWM comparator 6 and the step-up PWM comparator 7, respectively, having the triangular wave voltage VC input thereto. As shown in FIG. 2, the output voltage VB of the operational amplifier circuit 4 increases when the output voltage VA of the operational amplifier 3 decreases.

In FIG. 2, the lower limit voltage of the triangular wave voltage VC from the triangular wave oscillator circuit 8 is indicated as "VL" and the upper limit of the triangular wave voltage VC from the triangular wave oscillator circuit 8 is indicated as "VH".

Where the output voltage VA of the operational amplifier circuit 3 is equal to or greater than the upper limit voltage VH while the output voltage VB of the operational amplifier circuit 4 is equal to or less than the lower limit voltage VLt, the output signal SD of the step-down PWM comparator 6 is a low level and the output signal SE of the step-up PWM comparator 7 is a high level. During this period, the step-down switching transistor M1 is turned on 100%. Meanwhile, although the step-up switching transistor M3 is also turned on in this period, the step-up switching transistor M3 is switched from the PWM control to PFM control so that the step-up switching transistor M3 can be controlled to turn off in a short period(s) at a predetermined frequency. Therefore, the step-up switching transistor M3 is prevented from being turned on 100% during this period.

As the output voltage VA of the operational amplifier circuit 3 decreases to where the output voltage VA is equal to or greater than the upper limit voltage VH while the output voltage VB of the operational amplifier circuit 4 is between the lower limit voltage VL and the upper limit voltage VH of the triangular wave voltage VC, the output signal of the step-down PWM comparator 6 is a low level and the step-down switching transistor M3 remains 100% on. However, during this period, the output signal SE of the step-up PWM comparator 7 repeats switching back and forth between a high level and a low level. Since the step-up operation is performed based on the on/off switching control of the step-up switching transistor M3 according to the output signal SE of the step-up PWM comparator 7, the output voltage Vo having a voltage greater than that of the input voltage Vin is output.

FIG. 2 shows that the on-duty cycle of the step-up switching transistor M3 becomes smaller as the voltage of the output voltage VB increases. The output voltage VB of the operational amplifier circuit 4 becomes equal to or greater than the upper limit VH of the triangular wave voltage VC as the output voltage VA of the operational amplifier circuit 3 further decreases. Further, the output voltage VA of the operational amplifier circuit 3 is equal to that of the output voltage VB of the operational amplifier circuit 4 when the output voltage VA intersects the output voltage VB (AB intersection shown in FIG. 2). In this situation, both the output signal SD of the step-down PWM comparator 6 and the output signal SE of the step-up PWM comparator 7 become a low level, the step-down switching transistor M1 is turned on 100%, and the step-up switching transistor M3 is turned off 100%. Accordingly, the input voltage Vin is output to the output terminal Vout as is without being subject to any control (no control state).

As the output voltage VA of the operational amplifier circuit 3 further decreases to where the output voltage VA is between the upper limit voltage VH and the lower limit voltage VL of the triangular wave voltage VC, the output signal SD of the step-down PWM comparator 6 repeats switching back and forth between a high level and a low level while the output signal SE of the step-up PWM comparator 7 remains in a low level. During this period, the step-up switching transistor M3 is turned off 100% while the step-down switching transistor M1 is subject to on/off switching control according to the output signal SD of the step-down PWM comparator 6. Thereby, the output voltage Vo having a voltage smaller than that of the input voltage Vin is output. FIG. 2 shows that the on-duty cycle of the step-down switching transistor M1 becomes smaller as the voltage of the output voltage VA decreases.

As the output voltage VA of the operational amplifier circuit 3 further decreases to where the output voltage VA is equal to or less than the lower limit voltage VL of the triangular wave voltage VC, the output signal SD of the step-down PWM comparator 6 becomes a high level and the step-down switching transistor M1 is turned off 100%. It is to be noted that, where the step-down switching transistor M1 is turned off 100%, the PFM/PWM control circuit 12 switches control from PWM control to PFM control so that the step-up switching transistor M3 is switched from PWM control to PFM control so that the step-down switching transistor M1 can be controlled to turn on in a short period(s) at a predetermined frequency. Therefore, the step-down switching transistor M1 is prevented from being turned off 100% during this period.

Next, a relationship of the output voltage VA of the operational amplifier circuit 3 and the output voltage VB of the operational amplifier circuit 4 upon switching between the step-up operation and the step-down operation is described.

In a case where the resistance value of the resistor R4 of the inverting amplifier circuit is equal to the combined resistance value of the resistors R5 and R6 of the inverting amplifier circuit, the output voltage VB of the operational amplifier circuit 4 can be expressed by the following Formula (1).

$$VB = 2 \times Vs - VA \quad \text{[Formula 1]}$$

Since the timing of switching between the step-up operation and the step-down operation is the timing when the voltage of the output voltage VA of the operational amplifier circuit 3 becomes equal to the voltage of the output voltage VB of the operational amplifier circuit 4, a relationship of "VA=VB=Vs" can be obtained by applying a relationship of "VB=VA" to the above-described Formula (1). This shows that the shift voltage Vs is a voltage for switching between the step-up operation and the step-down operation. In other words, by setting the shift voltage Vs to a value equal to or slightly greater than the upper limit voltage VH of the triangular wave voltage VC, the operating mode (mode of step-up/step-down operation) can be switched after going through the no control state of performing neither the step-up operation nor the step-down operation. Thereby, switching between the step-up operation (step-up mode) and the step-down operation (step-down mode) can be performed smoothly.

Furthermore, according to the above-described embodiment of step-up/step-down switching regulator of the present invention, the output voltage VA of the operational amplifier circuit 3 always goes through a period of the step-down operation since the output voltage VA increases from a voltage of 0 V when power is turned on. Accordingly, the on-state of the step-down switching transistor M1 does not continue for a long period. Therefore, even without providing a soft-start circuit, no large inrush current is generated when power is turned on.

Hence, since the above-described embodiment of step-up/step-down switching regulator of the present invention performs a step-down operation with the output voltage VA of the operational amplifier circuit 3 included in an error amplifier circuit and performs a step-up operation with a voltage inverted from the output voltage (i.e. output voltage VB), an optimum phase compensation can be performed on the operational amplifier circuits 3 and 4. Accordingly, the frequency band of the operational amplifier circuit 3 can be extended as much as possible in the step-down operation and satisfactory load responding characteristics can be attained. Further, no soft-start is required since no inrush current is generated when power is turned on.

Although the above-described switching regulator is described as a synchronous rectifier type switching regulator, the present invention may be applied to other types of switching regulators. For example, both of or either one of the step-down synchronous rectifier transistor M2 and the step-up synchronous rectifier transistor M4 can be replaced with a rectifier diode. The triangular wave voltage VC may include a serrated wave voltage. Thus, the triangular wave voltage VC shown in FIG. 2 may be replaced with a serrated voltage.

Further, the present invention is not limited to these embodiments, but variations and modifications may be made without departing from the scope of the present invention.

The present application is based on Japanese Priority Application No. 2006-314288 filed on Nov. 21, 2006, with the Japanese Patent Office, the entire contents of which are hereby incorporated by reference.

What is claimed is:

1. A step-up/step-down switching regulator comprising:
   a step-up/step-down part using an inductor for stepping up or stepping down an input voltage from an input terminal and outputting the stepped-up/stepped-down voltage from an output terminal according to a control signal; and a control part for controlling the stepping-up/stepping-down by the step-up/step-down part according to a voltage difference between a proportional voltage proportional to the voltage output from the step-up/step-down part and a predetermined reference voltage;

wherein the control part includes an error amplifier circuit part for amplifying the voltage difference between the proportional voltage and the reference voltage and outputting the amplified voltage, an inverting amplifier circuit part for performing inverting amplification on the voltage output from the error amplifier circuit and outputting the inverted voltage, and an output control part for performing a step-down operation on the step-up/step-down part according to the voltage output from the error amplifier circuit part and performing a step-up operation on the step-up/step-down part according to the voltage output from the inverting amplifier circuit part.

2. The step-up/step-down switching regulator as claimed in claim 1, wherein the inverting amplifier circuit part includes a shift voltage generating circuit for generating a predetermined shift voltage and adding the generated shift voltage to the voltage output from the inverting amplifier circuit.

3. The step-up/step-down switching regulator as claimed in claim 1, wherein the step-up/step down part includes a step-down switching transistor switching on and off in performing the step-down operation and charging the inductor with the input voltage according to the voltage output from the error amplifier circuit part, a step-down rectifier element for allowing the inductor to discharge in performing the step-down operation, a step-up switching transistor switching on and off in performing the step-up operation and charging the inductor with the input voltage according to the voltage output from the inverting amplifier circuit part, and a step-up rectifier element for allowing the inductor to discharge in performing the step-up operation, wherein the output control part is configured to control the step-down switching transistor and the step-up switching transistor so that an on-duty cycle of the step-down switching transistor becomes 100% while the on-duty cycle of the step-up switching transistor becomes 0% when the voltage output from the error amplifier circuit part is equal to the voltage output from the inverting amplifier circuit part.

4. The step-up/step-down switching regulator as claimed in claim 3, wherein the output control part includes a triangular wave oscillator circuit for generating a predetermined triangular wave voltage and outputting the generated triangular wave voltage, a step-down output control circuit for comparing the voltage output from the error amplifier circuit part and the triangular wave voltage and controlling the switching of the step-down switching transistor according to the comparison result between the voltage output from the error amplifier circuit part and the triangular wave voltage, a step-up output control circuit for comparing the voltage output from the inverting amplifier circuit part and the triangular wave voltage and controlling the switching of the step-up switching transistor according to the comparison result between the voltage output from the inverting amplifier circuit part and the triangular wave voltage, wherein when the voltage output from the error amplifier circuit part is equal to the voltage output from the inverting amplifier circuit part, the equal voltage is greater than an upper limit voltage of the triangular wave voltage.

5. The step-up/step-down switching regulator as claimed in claim 3, wherein the step-down switching transistor, the step-down rectifier element, the step-up switching transistor, the step-up rectifier element, and the control part are integrated on a single IC.

* * * * *